April 21, 1959 N. B. TRITTIPOE 2,883,170
SPRAY BOOTHS
Filed Sept. 18, 1957

INVENTOR
N. B. TRITTIPOE
BY
ATTORNEY

United States Patent Office 2,883,170
Patented Apr. 21, 1959

2,883,170

SPRAY BOOTHS

Narrie B. Trittipoe, Jutland, N.J., assignor to Westfield Sheet Metal Works, Inc., Kenilworth, N.J., a corporation of New Jersey Application September 18, 1957, Serial No. 684,811

1 Claim. (Cl. 261—112)

Figure 1:
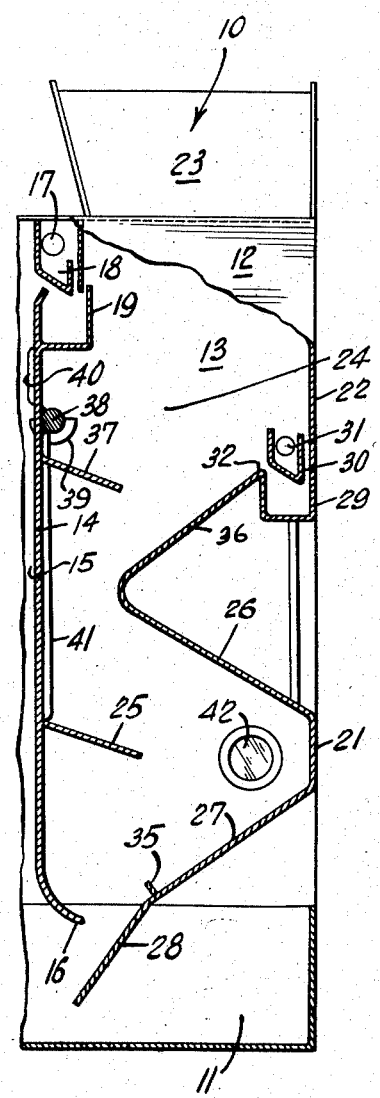
Figure 2:
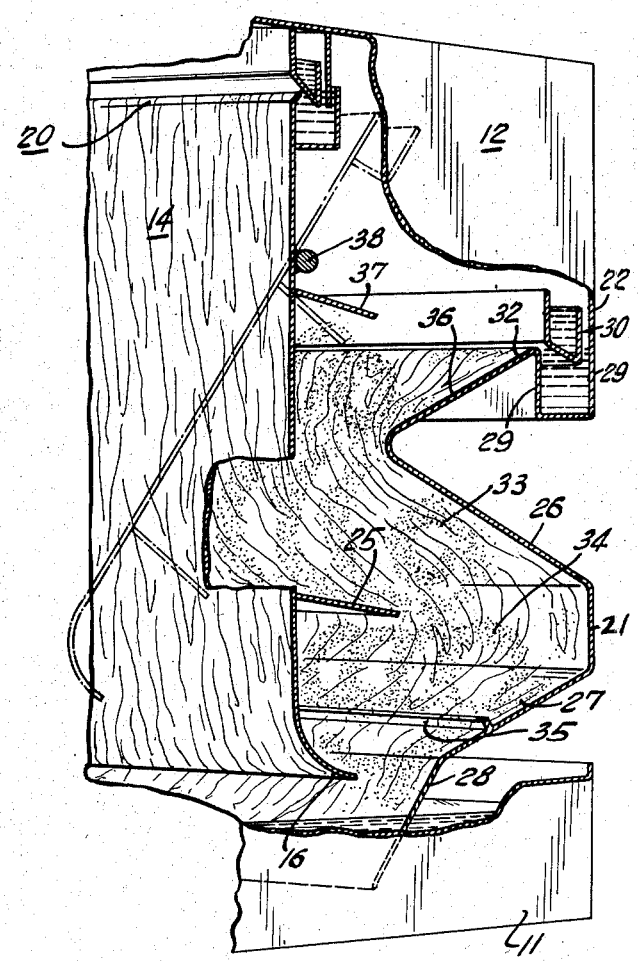

This invention relates to spray booths, and more particularly to novel booths for spraying articles and for cleaning the paint-laden air and for effecting recovery of paint particles. While numerous devices have been proposed in this art for cleansing air, novel structural features of the device of the present invention set up turbulent areas of atomized, swirling air cleansing sprays in the air exhausting space of the spray booth, highly efficient and effective for the purpose intended. In one form of the invention, means are provided for pivotal mounting of the plate member which constitutes the flood plate of the spray booth and for sealing the same when in a vertical position, to facilitate cleaning the booth. Examples thereof and of other practical devices embodying the invention are described below and in the accompanying drawings; the invention is not limited thereto, but covers all other forms coming within the scope or purview of the disclosure herein:

In the drawings: Fig. 1 is a vertical, partly broken, sectional view of a spray booth embodying the invention, Fig. 2 is a fragmentary, sectional, perspective view thereof.

The drawings show, as a convenient illustration of the invention, a (side draft) form of spray booth with a working enclosure in front of the water wall. The invention is applicable not only to spray booths of that type but also to down draft and other forms of spray booths, having working enclosures or areas variously disposed with reference to the water wall, as will become apparent to those versed or skilled in this art from the disclosure herein. The spray booth 10 shown in the drawings has a liquid-containing settling tank 11 at the bottom thereof and spaced side wall members 12, 13 extending upwardly of said tank, and a water wall plate member 14, vertically disposed in the booth between the side wall members and defining therewith a portion 15 in the booth wherein articles may be sprayed. The plate member 14 has a lower end 16 spaced from the settling tank 11 and means, such as a water supply pipe 17, emptying into a trough 18 fixed to the side walls 12, 13 of the spray booth 10 are provided so that water may flow therefrom into the trough 19 at the upper end of the plate member and over the upper end 20 of the plate member 14 and thence downwardly thereon, as noted in Fig. 2. A sheet 21 is disposed in said booth in rearwardly spaced relation to the plate 14 as part of rear scroll 22 of spray booth 10. The latter is provided with air exhausting means of any desired or convenient form such as an exhaust fan, for example, to draw air from the hood 23 in the spray booth aligned with the space 24 (Fig. 1) between the plate member 14 and baffle sheet 21 and disposed thereabove. The means used for exhausting air from the hood 23 may be a motor driven exhaust fan unit such as shown for example, at 25—29 in Patent 2,316,491. A baffle member 25 is secured to the plate 14 and extends therefrom toward, but terminates short of the sheet 21, the latter being angularly directed as at 26, 27 toward the plate 14 above and below the baffle member 25, to define a V portion (26, 27) into which the baffle 25 partly extends. The lower end 28 of the sheet 21 extends below the lower end 16 of the plate member 14. Means are provided at the top of the sheet for passing water thereover to flow downwardly thereon, as, for example, by forming a trough 29 at the upper end of the sheet and securing a trough 30 to the side walls 12, 13 of the spray booth, a water pipe 31 (Fig. 1) opening into the trough 30 so that water will first overflow from trough 30 to trough 29 and then from trough 29 over the upper edge 32 of the slope 36 of sheet 21 and donwardly thereon (Fig. 2).

On actuation of the exhaust fan in the operation of the device as set forth above and shown in the drawings, contaminated air will be drawn from the article spraying portion 15 of said booth, between the lower end 16 of the plate and the lower end 28 of the sheet 21, thence upwardly through space 24 between the sheet and plate, encountering the downwardly flowing water on the sheet and forming the turbulent areas of swirling atomized circular air cleansing sprays 33, 34 above and below the baffle member 25 in the said so-formed V portion 26, 27 of the sheet 21.

The lower end 28 of the sheet is preferably formed as an extension of the lower end of the V portion (26, 27) and extends into the tank 11, as shown in the drawings. The lower end 16 of the plate 14 is preferably curved toward the sheet 21.

A rib 35 may be formed on the sheet 21 and extended therefrom toward the plate at a point substantially vertically aligned with the end of the baffle 25 and substantially disposed therebelow (Fig. 1) to enhance the setting up of turbulent areas of swirling atomized water sprays 33, 34.

The sheet is directed away from the plate 14 by being angularly formed as noted at 36 above the V portion (26, 27) of the sheet. A second baffle member 37 may be secured to the plate 14 and extended therefrom toward but terminating short of the portion 36 of the sheet 21 so directed away from the plate to provide a second turbulent swirling atomized water area for the air being exhausted.

As shown in the drawings, means may be provided to pivotally mount the plate member 14, as for example, by providing it with a pin 38 positioned on supports 39 on the side wall members 12, 13 so as to enable the plate member to be pivoted (as shown in dotted lines in Fig. 2) to facilitate cleaning the booth. Means may be provided on the side wall members, such as vertically disposed flexible sealing strips 40, 41, for sealing the vertical edges of the plate member 14 when the latter is disposed in a vertical position of the booth and means may be provided (not shown) to latch plate 14 in vertical position. Inspection windows 42 may be provided in the side wall members 12, 13 of the booth within the so-formed V portion (26,27) thereof; a showing of one of the windows 42 on the wall 13 in Fig. 1 suffices for both.

Auxiliary mechanisms, well known in this art, may be used in carrying out the invention, such as valve mechanisms for connecting the tank 11 with a source of water supply, float controls for such valve mechanisms, a recirculating pump connected to the tank 11 and pipes connecting the pump to the discharge pipes 17 and 31 for troughs 18 and 30.

I claim:

In a spray booth having a liquid-containing settling tank at the bottom thereof, a plate member vertically disposed in said booth and having a lower end spaced from the settling tank, means at the top of the plate for passing water over said top edge and downwardly on the plate, a scroll sheet disposed in said booth in spaced relation to said plate, an air exhaust hood in the spray booth aligned with a space between the plate member and scroll sheet, a baffle member secured to the plate and extending therefrom toward but terminating short of the sheet, said sheet being angularly directed toward the plate above and below the baffle member so as to define a V portion into which the baffle partly extends, and means at the top of the sheet for passing water thereover to flow downwardly thereon, so that air will be drawn between the lower end of the plate and the lower end of the sheet, and thence upwardly between the sheet and plate, encountering the downwardly flowing water on the sheet, forming turbulent areas of atomized swirling air cleansing sprays above and below the baffle member in said so-formed V portion of the sheet, a fixed pivot in the booth, means pivotally mounting the plate member on said pivot for location thereon to facilitate cleaning the booth, and means for sealing the vertical edges of said plate member when the latter is disposed in a vertical position in the booth.

References Cited in the file of this patent

UNITED STATES PATENTS

| | | |
|---|---|---|
| 1,066,837 | Nordensson | July 8, 1913 |
| 1,103,995 | Murray | July 21, 1914 |
| 2,077,427 | Lissman | Apr. 20, 1937 |
| 2,180,586 | Gustafsson | Nov. 21, 1939 |
| 2,316,491 | Teichner | Apr. 13, 1943 |
| 2,373,330 | Nutting | Apr. 10, 1945 |
| 2,714,938 | Smith | Aug. 9, 1955 |
| 2,788,954 | Paasche | Apr. 16, 1957 |
| 2,805,844 | McMaster | Sept. 10, 1957 |